March 30, 1965 C. M. CLARK 3,176,274

RECORDING STORAGE TUBE READOUT METHOD AND APPARATUS

Filed March 31, 1958 4 Sheets-Sheet 1

INVENTOR
CALVIN M. CLARK

BY Frank E. Johnston
George W. Wasson
ATTORNEYS

March 30, 1965 C. M. CLARK 3,176,274

RECORDING STORAGE TUBE READOUT METHOD AND APPARATUS

Filed March 31, 1958 4 Sheets-Sheet 2

INVENTOR
CALVIN M. CLARK
BY Frank E. Johnston
George W. Wasson
ATTORNEYS

INVENTOR
CALVIN M. CLARK
BY Frank E. Johnston
George W. Wasson
ATTORNEYS

INVENTOR
CALVIN M. CLARK
BY Frank E. Johnston
George W. Wasson
ATTORNEYS

United States Patent Office 3,176,274
Patented Mar. 30, 1965

3,176,274

RECORDING STORAGE TUBE READOUT METHOD AND APPARATUS

Calvin M. Clark, Fullerton, Calif., assignor to California Research Corporation, San Francisco, Calif., a corporation of Delaware Filed Mar. 31, 1958, Ser. No. 725,241
4 Claims. (Cl. 340—172.5)

This invention relates to the operation of recording storage tubes and more particular to their use as pulse height analyzers.

In my copending application, Serial No. 451,525, for Circular Scanning System for Recording Nuclear Energy Spectrum, filed August 23, 1954, now Patent No. 2,856,537 and Serial No. 668,781 for Pulse Height Analyzer, filed June 28, 1957, now Patent No. 2,968,724, and in Delmar O. Severs, Serial No. 433,244, filed May 28, 1954, now Patent No. 2,802,951, all assigned to the assignee of the present application, the use of a cathode ray storage tube as a pulse height analyzer is disclosed particularly with its relationship to nuclear spectroscopy, detection and analysis. In this application there are disclosed methods for operating a cathode ray storage tube as a waveform amplitude analyzer in a manner for improving the linearity between the information accumulated on the storage surface of the storage tube and the eventual recorded analysis of the accumulation.

In the use of a cathode ray storage tube as a pulse height analyzer the information transmitted to the storage tube may be accumulated therein in the manner of half tone writing. In this procedure the storage surface of the storage tube is provided with an initial potential charge to be reduced in increments in accordance with information transmitted to the storage surface. After a sufficient quantity of information has been accumulated on the storage surface, the information may be read from the surface by the process of half tone reading to produce an output signal modulated in accordance with the information accumulated within the storage tube. The linearity of the output signal with respect to the information stored within the storage tube will be dependent both upon the linearity of the accumulation of the information and the linearity of the reading characteristics of the particular storage tube. The use of a cathode ray storage tube as a practical pulse height analyzer is therefore dependent, as above stated, upon the linearity of the storage and reading process while, at the same time, the actual shape of the curve of the output signal current versus potential on the storage elements may also be a function of the geometry of the tube and the collector system. Because of these factors, the linearity of reading in half tones and the range of target element potentials necessary for practical operation in this manner will be determined by the above factors.

The object of the present invention is to provide a method of operating a cathode ray storage tube employing grid controlled transmission modulated reading in a manner to provide improved linearity between the information stored within the tube and the signal derived from information stored therein.

A further object of the present invention is the provision of a method and apparatus for operating a cathode ray storage tube in a manner to adjust repeatedly or continuously the potentials applied to certain of the storage tube elements to achieve improved linearity of reading.

A further object of the present invention is a method for operating a storage tube to extend the range of its capacity for linear integration of information signals.

Further objects and features of the invention will be readily apparent to those skilled in the art from the specification and appended drawings illustrating certain preferred embodiments in which:

FIG. 10 illustrating the improvement with dynamic priming.

Figure 5:
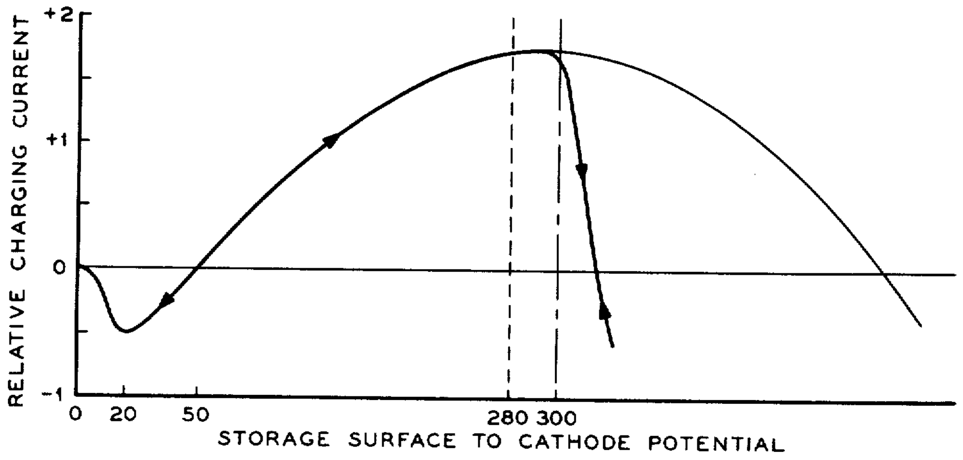
FIG. 5 is a graph of the secondary emission characteristics of a cathode ray storage tube.

A cathode ray storage tube of the type herein illustrated includes a high transparency storage screen structure constituted of a metallic mesh with a storage dielectric material deposited thereon. The storage of information is accomplished through the modification of an initial charge on its storage surface in accordance with the bombardment of the surface by a cathode ray beam intensity-modulated in accordance with the information to be accumulated on the storage surface. In order to accomplish this modification of the initial charge, the storage surface is initially charged, or primed, with a potential that subsequently may be altered or modified in accordance with the information transmitted thereto. Referring now to FIG. 5 wherein is illustrated a typical secondary emission characteristic curve of a cathode ray storage surface, it is indicated that the beam of primary electrons flowing through the storage tube and striking the storage surface will cause secondary electron emission resulting in a net gain or loss of electrons from the storage surface depending upon the potential between the storage surface and the cathode of the tube. As is illustrated in FIG. 5 between the range of zero and the first crossover potential, approximately 50 volts, the electron beam striking the surface will result in a net accumulation of electrons (or negative charge) on the storage surface, whereas from 50 volts up to the second crossover potential, the electrons striking the storage surface will result in a net removal of electrons therefrom through the process known as secondary emission, with one or more electrons being removed for each electron striking the storage surface of the storage screen structures. To prime the storage surface for the storage of information, it is desirable to place the potential of the entire storage screen at the potential corresponding to the dip in the secondary emission curve, illustrated in FIG. 5 as being at about 20 volts. With the mesh of the storage structure maintained at this potential of approximately 20 volts, the storage surface may be scanned with an electron beam causing the accumulation of electrons on the storage surface thereby causing the storage surface to assume a potential of something less than the potential of the mesh of the storage structure. In this manner a charge of 20 volts may be primed on to the storage surface, so that the entire storage surface will be 20 volts negative with respect to the mesh of the storage structure. It is this initial priming of the storage surface that will be modified in accordance with the information transmitted by the electron beam to the elemental storage areas of the storage surface and by this modification, the writing or accumulation of information is performed.

To operate the storage surface as a means for storing information, the mesh of the storage structure is raised to a potential of approximately 400 volts placing the storage surface potential at a point of maximum secondary emission, as illustrated in FIG. 5. It is desirable to place the storage screen mesh at a point on the illustrated curve where the secondary emission characteristic of the storage surface will be approximately flat in order that a linear relationship will exist between the integrated electron-beam current bombarding the storage surface and the consequent reduction of charge produced thereon. This linear relationship will hold until the storage surface reaches the same potential as the mesh of the storage structure after which saturation is approached. Further bombardment of the storage surface will cause the number of electrons removed therefrom by secondary emission and attracted to the metallic mesh to be reduced until this number becomes equal to the number of electrons that are collected by the storage surfaces, thus resulting in an equilibrium condition at the storage surface. In this equilibrium or saturated condition, no further removal of electrons through the bombardment of the storage surface is possible; this establishes the upper limit of the accumulation of information on the storage surface.

It may be seen from the foregoing paragraph that information is accumulated on the storage surface in the form of a positive charge modification of the negative potential on the primed storage elements or elemental areas by means of continuous or repeated electron bombardment of the storage surface. Thus, within the range of linear charge accumulation, a measure of the modification of the potential on the storage surface should be a true indication of the amount of information accumulated thereon.

Figure 3:
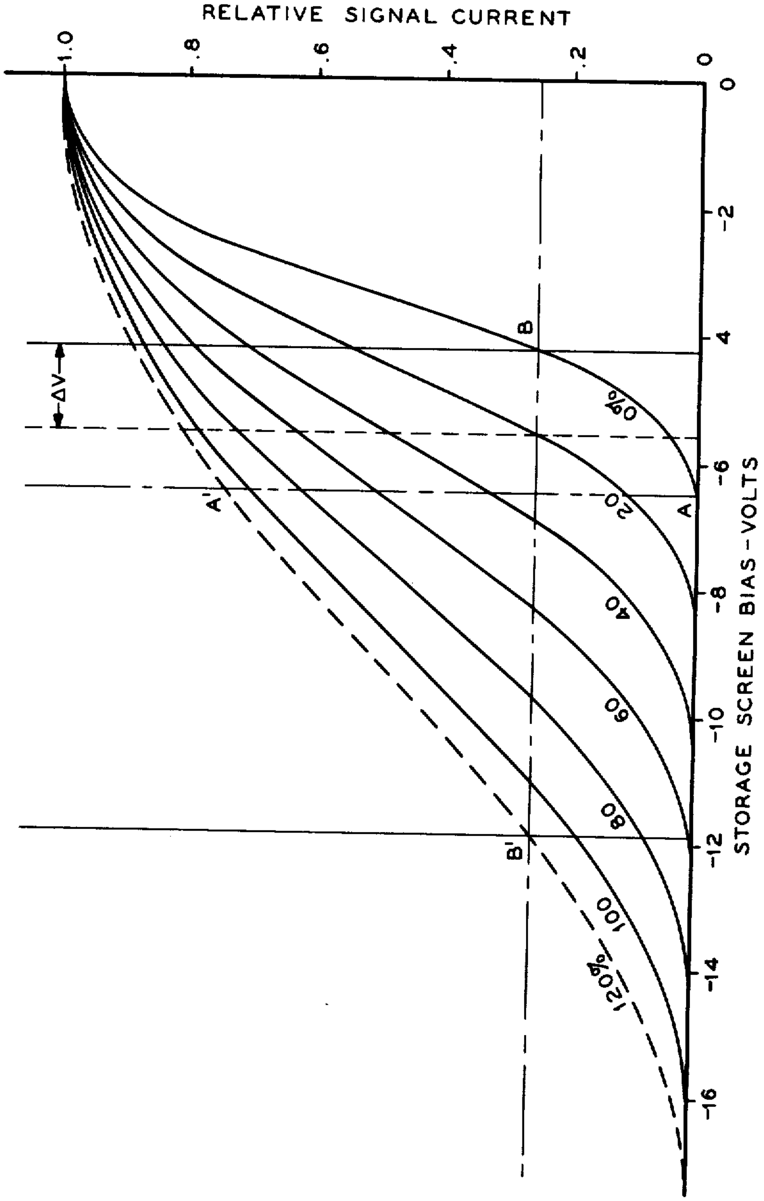
FIG. 3 is a graph illustrating a family of storage-screen transfer characteristic curves of a cathode ray storage tube of the grid control reading type.

The chart of FIG. 3 illustrates in graph form a family of storage-screen transmission characteristic curves relating signal current output to storage-screen bias for constant amounts of charge modification expressed as percentages of maximum linear charge accumulation. Storage-screen bias as referred to here and as illustrated in FIG. 3 is intended to indicate the storage mesh potential relative to the cathode potential with the initial storage surface prime potential subtracted therefrom. These curves are characteristic of charge modification effected by repeated pulsed bombardment along a single scanned line or circle of storage elements; similar curves of constant charge modification effected by continuous scanning of the entire storage surface differ in slope, but not in spacing measured along a constant relative signal current line.

Figure 4:
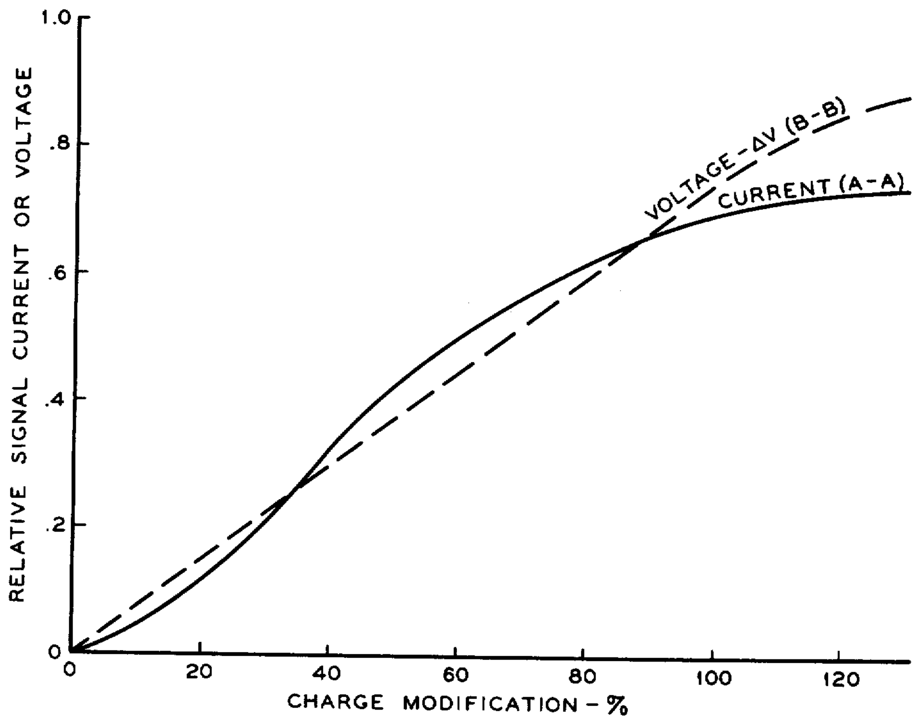
FIG. 4 is a graph illustrating signal output versus percent charge modification of the storage surface and comparing the linearity of reproduction through prior art methods to that achieved by operation in the methods of the present invention.

Reading of stored information heretofore has been accomplished by fixing the storage screen bias (storage screen-cathode potential) at a valve such as indicated by point A where an output signal current may be derived for all levels of storage surface charge modification. The signal current output at this constant voltage bias, line A–A′ in FIG. 3 versus percent of charge modification, is shown by the solid line curve, A–A′, in FIG. 4. This curve illustrates the non-linearity of the aforementioned reading process; the signal current output does not increase linearity through the linear-charge-accumulation region of 0 to 100% charge modification.

It may be seen from FIG. 3 that if the cathode ray storage tube is operated during its reading operation in a manner such that the signal current output is maintained constant, as along line B–B′ in FIG. 3, the variation in storage screen bias (storage screen—cathode potential), $\Delta V$, that is necessary to keep the signal current constant is linearly related to the percent of charge modification within its linear—charge—accumulation region of 0 to 100%. If, then, by some means this necessary storage screen bias variation, $\Delta V$, can be made the dependent variable relative to the charge modification this variation may be used as a signal voltage, and the signal voltage output along the constant current line, B–B′, in FIG. 3 versus percent of charge modification can be shown by the dashed line, B–B′, in FIG. 4.

Figure 1:
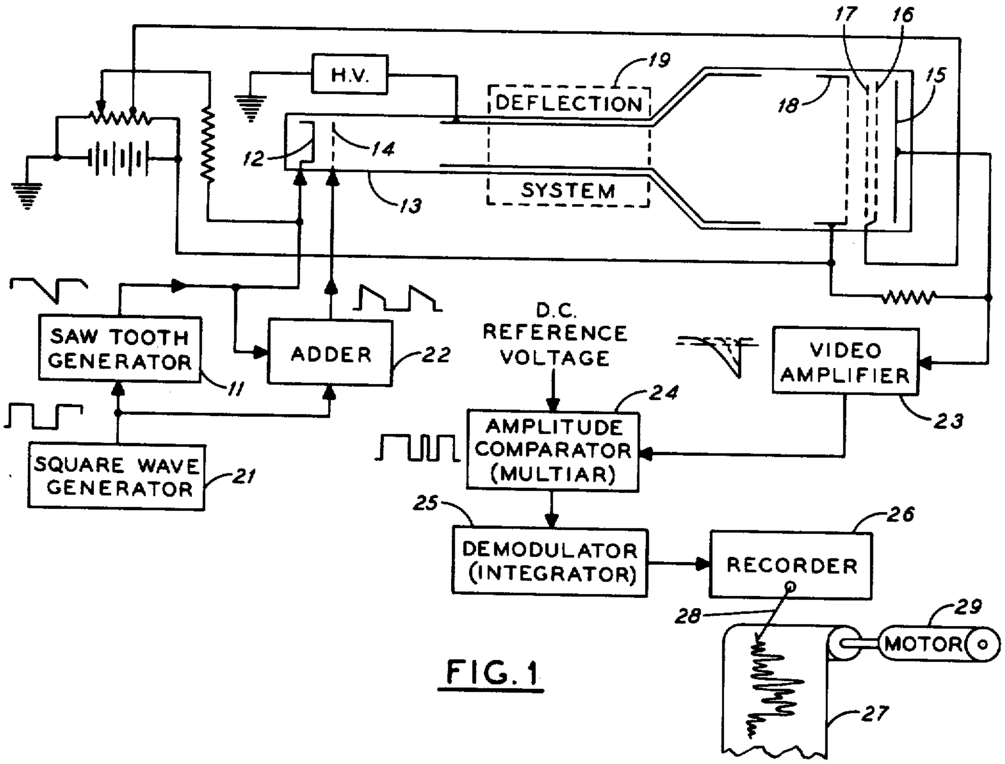
FIG. 1 is a schematic diagram of one form of an improved reading system for a cathode ray storage tube.
Figure 2:
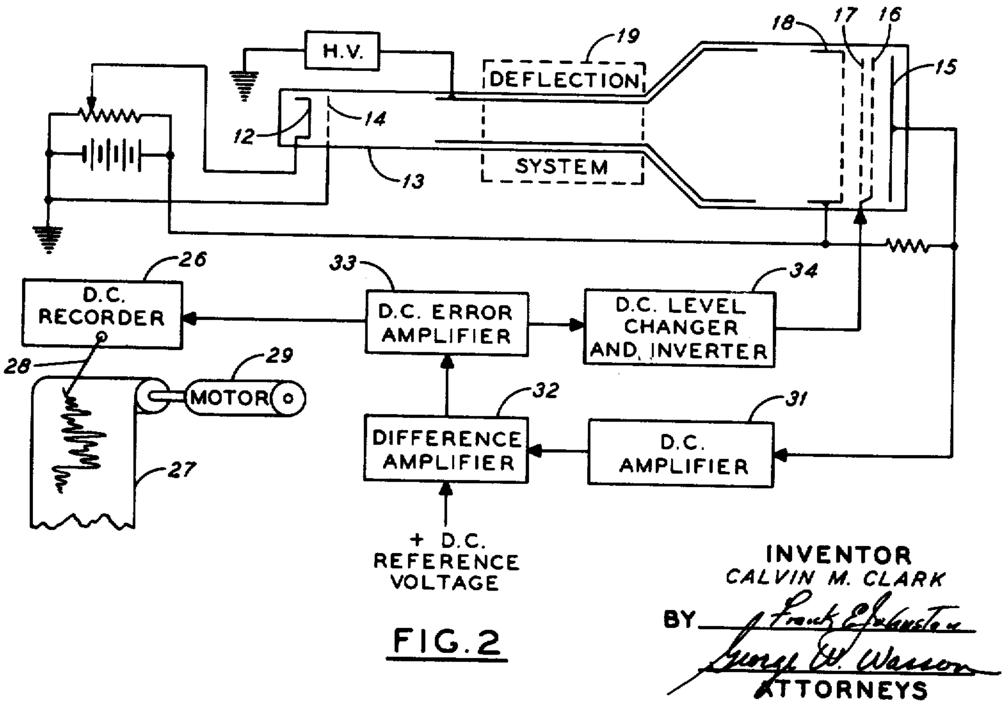
FIG. 2 is an alternative form of a cathode ray storage tube reading system.

To accomplish the purposes of the foregoing paragraphs, the apparatus as illustrated in the schematic diagrams of FIG. 1 or 2 may be employed. FIG. 1 illustrates a periodical adjustment of the cathode potentials for the storage tube in its reading operation to provide a periodical sweeping signal current through the elemental storage areas of the tube. A voltage developed by this current through a suitable load resistor may then be compared to a constant reference voltage to produce an output signal of constant amplitude pulses having a duration proportional to the amount of storage element charge modification. FIG. 2 illustrates a continuous feed back method where the amount of voltage feed back to the storage mesh of the storage tube is proportionate to the amount of the charge modification on an elemental storage area.

FIG. 1 schematically illustrates a manner for continuously and repeatedly adjusting the voltage between the cathode and the storage surface of the storage tube. To accomplish the desired adjustment a sawtooth generator 11 is connected to the cathode 12 of a storage tube 13 having a control grid 14, a target plate 15, a storage structure composed of storage screen mesh 16 with a dielectric coating 17 and a collimating lens 18 including an anode, decelerating shield and screen. Conventional high voltage and bias supplies are also provided for the storage tube as shown along with a deflection system 19 energized in a manner to provide the desired sweeping or scanning of the storage surface both in writing and in reading. With the sawtooth generator 11 connected to the cathode 12 the cathode potential is periodically adjusted in the waveform as shown adjacent to the sawtooth generator 11. A square wave generator is provided for energizing the sawtooth generator 11 and an adder circuit 22 so that the cathode and control grid potentials are periodically adjusted in synchronism. The output of the adder 22 to the control grid 14 is in the form of the waveform shown adjacent to the adder 22 and is a sawtooth superimposed on the square wave input. In this manner, the cathode and control grid are maintained with a constant differential potential with respect to each other whereas, with respect to the decelerating shield and screen, storage screen, and target plate of the storage tube, these potentials are varying in the form of the sawtooth generator waveform. With this energization the storage tube elements are repeatedly varied between the adjusted limits of the graph as illustrated in FIG. 3 so that the amount of adjustment in the amount of the $\Delta V$ as shown in FIG. 3.

Reading through a cathode ray storage tube of the type herein referred to having half tone writing on the storage element is accomplished in the manner known as grid-control reading. As has been previously stated, the storage surface of the storage tube has been initially primed so as to be negative with respect to the metallic mesh shown at 16. The process of writing on the storage dielectric material 17 accomplishes a gradual reduction in this initial priming potential in accordance with the information transmitted thereto. For reading, the storage surface mesh is switched in potential to make the storage surface more negative than the cathode so that, as has been previously stated, the dielectric material 17 of the storage structure will be negative by varying amounts in accordance with the information written thereon. Upon scanning the storage surface with an unmodulated primary electron beam capable of penetrating the mesh of the storage structure, the beam may now be modulated in accordance with the amount of negative priming remaining on the storage surface. The degree of modulation being due to the negative charges on the dielectric surface establishing decelerating fields of varying magnitudes in the holes through the storage mesh in the path of the electrons to the target plate. As a result, the number of primary electrons which will penetrate the mesh of the storage structure will depend upon the amount of negative charge stored on the corresponding portions of the dielectric material surface 17. Those electrons penetrating the storage structure will be collected at the target plate establishing current variations that may be passed through an appropriate load resistor to produce signals corresponding to the potential variations across the storage surface. Without further treatment, these signal variations would be in the nonlinear path of the S-shaped curve of FIG. 4 for varying degrees of charge modifications of the storage surface.

With the circuitry schematically illustrated in FIG. 1, the potential difference between the cathode and the storage screen will be periodically varied to effect an additional controlled variation in the current to the target plate. This periodic variation of the potential difference between the cathode and the storage screen will further modulate the primary electron beam so that the current flowing to the target plate is now a function of not only the charge modification of the storage surface but also of the periodic storage screen bias variation as seen in FIG. 3.

The resulting signal output across the load resistor connected to the target plate 15 is then fed to a video amplifier 23 and to an amplitude comparator, or "multiair," circuit 24 where this signal having the approximate waveform shown adjacent to the video amplifier is compared to the dotted line D.C. reference voltage also shown. The amplitude comparator circuit is a conventional electronic circuit for sensing the time when a sloping negative-going waveform becomes equal to a constant reference voltage. With repeated periodical variations of the cathode potential, the output of the amplitude comparator circuit may be shown as the waveform adjacent thereto and will constitute a series of constant amplitude pulses of varying time duration. The time of duration of these pulses is determined by the amount of charge modification on the storage surface through the sensing of the instant when the negative-going waveform attains the same potential as the constant D.C. reference voltage. In this manner, these signal pulses will be an indication of the amount of cathode adjustment required to establish the desired constant signal current through the storage tube.

The output of the amplitude comparator is fed to a demodulator 25 and therethrough to a recorder 26 where the series of positive pulses is integrated to a slowly varying D.C. signal having a pattern as illustrated in the chart 27 from the record markings of a stylus 28 driven from the recorder 26. A motor 29 is provided for the constant drive for the recorder 27.

In the manner of the foregoing circuit, the cathode ray storage tube is operated to provide a linear response to the incremental variations in the charge modifications on the storage surface through the conversion of the signal current through the storage tube from amplitude modulation to time modulation. The circuitry of the present invention may also be used to provide other than a linear characteristic through the tube by changing the waveform of the sawtooth generator 11 to a generator of a waveform having a preselected nonlinear fall.

FIG. 2 illustrates an alternative circuit for performing the linearity improvements of the present invention. Like elements and components of the circuit of FIG. 2 are designated by the same numbers as shown in FIG. 1 in both the storage tube and the circuit elements. In the circuit of FIG. 2, reading is accomplished through the storage tube in the grid control reading method as described for the reading process of the FIG. 1 circuit. The primary electron current through the storage tube produces a signal through the target plate 15 which is applied to a D.C. amplifier 31 and thence to a differential amplifier 32. In the differential amplifier, the signal from the storage tube is compared to a D.C. reference voltage and the difference or error output from the differential amplifier is fed to a D.C. error amplifier 33. The error signal is fed to a D.C. level changer and inverter 34 from which the error signal is fed back to the mesh 16 of the storage structure so as to vary the potential on storage mesh in accordance with the signal through the storage tube. The error signal is also fed to the recorder 26 where a record is provided on chart 27 by the movements of stylus 28 with the chart being driven by motor 29 as in FIG. 1. In the circuit and system of FIG. 2, the cathode and grid potentials are maintained constant and the storage surface potential is adjusted in accordance with the signal through the tube to provide the $\Delta V$ movements as designated in FIG. 3 and FIG. 4.

In the operation of the storage tube in the manner as herein described with respect to the circuits of FIGS. 1 and 2, the signals through the storage tube attain a constant signal strength. The indication of the amount and character of information stored within the storage tube will be derived from the amount of adjustment of certain internal tube elements to establish the desired constant current. The circuit of FIG. 1 will provide the desired indication through the sensing of time intervals while the circuit of FIG. 2 will provide its indication through the sensing of feedback voltages.

Figure 6:
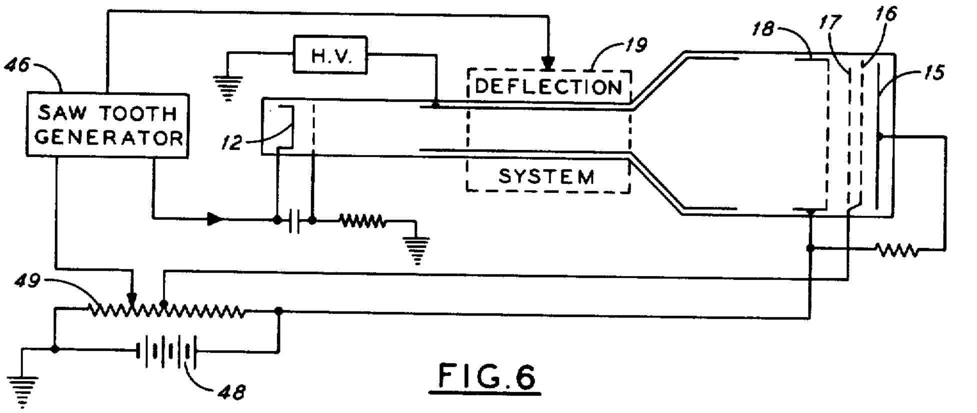
FIG. 6 is a schematic diagram illustrating a circuit for dynamic priming of the storage surface of a cathode ray storage tube.
Figure 7:
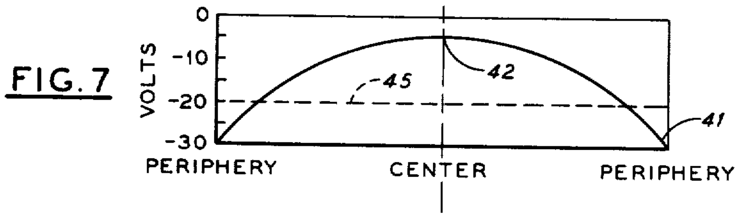
FIGS. 7 and 8 are graphs indicating a pair of dynamic priming characteristics that may be established on the storage surface with the schematic circuit as illustrated in FIG. 6.
Figures 8, 9, 10:
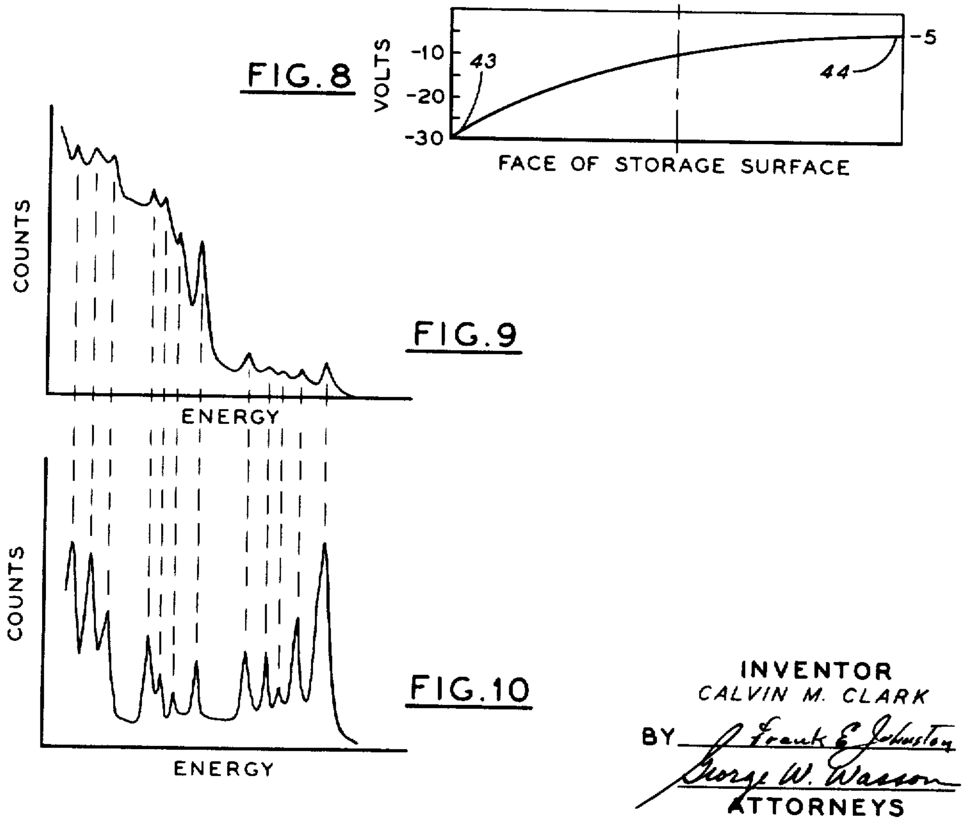
FIGS. 9 and 10 represent typical signals recorded from information stored in a cathode ray storage tube pulse height analyzer.

A further improvement of the characteristics of a cathode ray storage tube, particularly in its use as a nuclear spectroscopy gamma ray spectrum recording device, is disclosed in FIGS. 6 through 10. In the aforementioned copending applications of the present inventor, polar coordinate scanning systems have been disclosed whereby a circular storage surface may provide an increased storage area utilization for the information transmitted to the storage tube. As may be seen in the FIG. 9 graph, the total number of counts at the lower energy range of the graph is considerably higher than the total number of counts at the higher energy range. Because of this, the capacity of the storage surface is restricted by its saturation limitation for those energies that involve the highest number of counts. As has been previously defined, the capacity of the storage surface for the accumulation of information is determined by the amount of the priming voltage or potential established between the dielectric surface of the storage screen and the metallic mesh thereof. This capacity may be extended for a nuclear spectroscopy recording storage tube if the areas where the higher count gamma rays are to be recorded is provided with a much higher dielectric priming potential. FIG. 7 illustrates one pattern of charge priming for the storage surface with the peripheries having a much greater negative potential as at 41 and the center having a lesser negative priming potential as at 42. The priming of FIG. 7 may be used in a circular or radial scanning system or in the system having concentric circles as storage areas. FIG. 8 illustrates a form of priming for the use of the storage surface in a rectangular coordinate form wherein one edge as at 43 may be provided with the greater negative priming potential while the other edge at 44 may have the lesser potential. It may also be seen from the priming arrangement as shown in FIG. 7 that the priming may be accomplished in a nonlinear gradation so as to correspond to the non-linearity of the expected response as illustrated in FIG. 9. FIG. 7 further illustrates, in dotted lines at 45, the conventional constant level priming of the storage surface.

To accomplish this charge variation or dynamic priming of the storage surface, the apparatus as illustrated schematically in FIG. 6 may be employed wherein a sawtooth generator 46 is connected to the cathode 12 to control the electron beam used in the priming process previously defined. The output of the sawtooth generator may also be applied to the deflection system 19 to accomplish the priming pattern particularly as illustrated in FIG. 8. A priming pattern as shown in FIG. 7 may be accomplished by rotating the deflection system or by applying a polar coordinate energization, such as sine-cosine resolvers, to the deflection system. A battery 48 with its load resistor 49 is provided to establish the static potentials required for the priming operation.

The dynamic priming, as pictorially illustrated in FIGS. 7 and 8, may provide for an additional improvement in the signal definition illustrated in FIG. 10 where the trailing edge of a recorded nuclear spectroscopy gamma ray spectrum is accentuated through the continued storage of additional information made available by the increased capacity at the leading or low energy range of the storage surface. Through the provision of an increased capacity at the high count, low energy range, the inherent accuracy of detection of these signals is maintained so that increased response in the low count, high energy ranges may be realized through the continued detection and recording of the high energy signals. In the gamma ray spectrum as illustrated in FIG. 9, the low energy range of gamma ray counts is superimposed upon a background of "noise" of gamma ray signals known as Compton background. By use of the dynamic priming procedure, as herein disclosed, the Compton background can be substantially removed so as to provide a peak enhanced signal spectrum. The removal is done prior to the storage of the gamma ray spectra by dynamic priming adjustment. In this manner, the threshold level of the storage surface is increased in the energy range of the gamma ray spectra where the Compton background is expected to be the highest.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. An apparatus for improving the linearity of information readout from a recording storage tube comprising in combination; a recording cathode ray storage tube, having elements for producing an electron beam, a target element and a storage surface upon which information may be stored in the form of varying relative charge modifications in accordance with varying relative information transmitted thereto, circuit means for energizing the electron beam elements of said storage tube, said energizing means including means for varying the relative potential between said electron beam elements and said storage surface of said storage tube in accordance with a continuously repeating wave form pattern, means for deflecting said electron beam to scan said storage surface to sense the information stored thereon in the form of charge modifications, circuit means connected to said target element for collecting said electron beam and for producing signals representative of said collected electron beam, said signals being dually modulated in accordance with the information stored on said storage surface and varied in accordance with said relative adjustment of said electron beam elements, an amplitude comparator circuit for comparing said signals with a reference voltage and including means for producing a plurality of time modulated pulses in accordance with the occurrence of equality between said signals and said reference voltage, and means for integrating and recording said time modulated pulses as an indication of the operation of said storage tube in its linear information readout condition.

2. An apparatus for improving the linearity of information readout from a recording storage tube having an electron gun and a storage surface upon which information may be stored in the form of varying relative charge modification in accordance with varying relative information transmitted thereto, said recording storage tube comprising an electron gun section, a storage element, a deflection system for deflecting an electron beam from said electron gun to scan said storage surface to sense the information stored thereon and a target element for collecting said electron beam, said beam being collected by said target element and being modulated in accordance with the information stored on said storage surface, circuit means for developing a signal modulated in accordance with said modulation of said electron beam, circuit means for comparing said signal to a constant reference voltage and to generate a signal representative of departure from a constant electron beam current at said target element, a feedback circuit for controlling the relative potential of said storage surface with respect to said electron gun section to maintain a constant current signal through said storage tube.

3. A method for improving the reading linearity from a recording storage tube having an electron gun and a storage surface upon which information may be stored in the form of charge modifications in accordance with information transmitted thereto comprising the steps of scanning the storage surface with an electron beam from said electron gun to establish an initial charge pattern thereon, modifying the charge on said storage surface with information to be analyzed, scanning said storage surface with an electron beam from said electron gun so as to establish an electron beam current modulated in accordance with the information stored on said surface, collecting said modulated beam current to produce a signal having a time base modulation in accordance with the information stored on said storage surface, detecting the instantaneous amplitude of said modulation of said signal, adjusting the relative voltages between the electron gun elements and the storage surface to vary the instantaneous amplitude of said modulation to derive a pre-established modulation amplitude for said signal, and energizing a display means in accordance with said adjustment so as to record the amount of said adjustment as a measure of the stored information on said storage surface.

4. A method for reading information having a pre-established comparative energy spectrum and accumulated in the form of charged modifications on the storage surface of a recording storage tube, said tube including elements for producing a primary electron beam, deflection means and said storage surface, comprising the steps of:

(*a*) scanning said storage surface in a prescribed scanning pattern with a primary electron beam from said beam-producing elements, (*b*) collecting a current derived from said primary electron beam passing through said storage surface, said collected current being representative of a signal modulated with respect to time in accordance with both said prescribed scanning pattern and with said accumulated information on said storage surface, (c) detecting said modulation of said current to determine the instantaneous signal amplitude representative of said accumulated information along said prescribed scanning pattern, (d) adjusting the relative voltages between said voltage tube elements for producing said primary electron beam and said storage surface to continuously adjust said instantaneous signal amplitude to a predetermined modulation of said collected current, (e) and energizing a means including a time base record establishing means to record the amount of said adjustment as a measure of said accumulated information stored on said storage surface and read in accordance with said scanning pattern.

References Cited in the file of this patent

UNITED STATES PATENTS

| | | |
|---|---|---|
| 2,646,465 | Davis et al. | July 21, 1953 |
| 2,657,377 | Gray | Oct. 27, 1953 |
| 2,657,378 | Gray | Oct. 27, 1953 |
| 2,685,615 | Biddulph et al. | Aug. 3, 1954 |
| 2,755,996 | Williams et al. | July 24, 1956 |
| 2,811,665 | McNaney | Oct. 29, 1957 |
| 2,830,285 | Davis | Apr. 8, 1958 |
| 2,855,539 | Hoover | Oct. 7, 1958 |

OTHER REFERENCES

Publication: An article "Recording Storage Tube" by Hergenrother and Gardner, IRE Proceeding, July 1950 (pages 740–747).

UNITED STATES PATENT OFFICE

CERTIFICATE OF CORRECTION

Patent No. 3,176,274 March 30, 1965

Calvin M. Clark

It is hereby certified that error appears in the above numbered patent requiring correction and that the said Letters Patent should read as corrected below.

Column 4, line 71, after "adjustment" insert -- is --; column 5, line 73, for "recorder" read -- record --; column 8, line 22, after "thereon" insert a comma; column 9, lines 5 and 6, for "voltage" read -- storage --.

Signed and sealed this 24th day of August 1965.

(SEAL)
Attest:

ERNEST W. SWIDER
Attesting Officer

EDWARD J. BRENNER
Commissioner of Patents